United States Patent [19]

Moorehead

[11] Patent Number: 4,828,813

[45] Date of Patent: May 9, 1989

[54] SILICEOUS METAL-CONTAINING CRYSTALLINE COMPOSITIONS

[75] Inventor: Eric L. Moorehead, Kendall Park, N.J.

[73] Assignee: Union Oil Company of California, Los Angeles, Calif.

[21] Appl. No.: 54,110

[22] Filed: May 20, 1987

Related U.S. Application Data

[63] Continuation of Ser. No. 335,887, Dec. 30, 1981, abandoned.

[51] Int. Cl.$^4$ .................. C01F 17/00; C01B 35/00; C01B 33/28; C01G 15/00
[52] U.S. Cl. ........................... 423/263; 423/279; 423/326; 423/328; 423/624
[58] Field of Search ................ 423/326–332, 423/624; 502/73, 77, 263

[56] References Cited

U.S. PATENT DOCUMENTS

| | | | |
|---|---|---|---|
| 3,530,064 | 9/1970 | Chen | 208/113 |
| 3,769,386 | 10/1973 | Bundell et al. | 252/455 Z X |
| 3,941,871 | 3/1976 | Dwyer et al. | 423/326 |
| 4,061,724 | 12/1977 | Grose | 423/335 |
| 4,331,641 | 5/1982 | Hinnenkamp et al. | 423/326 X |

FOREIGN PATENT DOCUMENTS

| | | | |
|---|---|---|---|
| 2830830 | 1/1980 | Fed. Rep. of Germany | 423/326 |
| 2831611 | 2/1980 | Fed. Rep. of Germany | 423/326 |
| 2831631 | 2/1980 | Fed. Rep. of Germany | 423/326 |
| 6802468 | 8/1968 | Netherlands | 423/328 |
| 2024790 | 1/1980 | United Kingdom | 423/326 |
| 2033358 | 5/1980 | United Kingdom | 423/328 |
| 2071071 | 9/1981 | United Kingdom | 423/326 |

*Primary Examiner*—John Doll
*Assistant Examiner*—R. Bruce Breneman
*Attorney, Agent, or Firm*—Yale S. Finkle; Gregory F. Wirzbicki

[57] ABSTRACT

A novel siliceous crystalline composition of matter further comprising one or more metals is prepared by admixing a basic silica salt and a dissolved metal salt in the presence of a quaternary ammonium ion and subsequently heating under pressurized conditions. This novel composition of matter is useful as a catalyst for oxidation, alkylation, disproportionation, synthesis gas conversion, hydrocracking, and hydrodewaxing.

21 Claims, No Drawings

SILICEOUS METAL-CONTAINING CRYSTALLINE COMPOSITIONS

CROSS REFERENCES TO RELATED APPLICATIONS

This application is a continuation of U.S. patent application Ser. No. 335,887, filed in the United States Patent and Trademark Office on Dec. 30, 1981 and now abandoned.

BACKGROUND OF THE INVENTION

1. Field of the Invention

The present invention relates to siliceous crystalline compositions, a method for preparing same, and processes which involve its use. More particularly, the invention relates to siliceous crystalline compositions further containing a metallic component.

2. Prior Art

Silicon is second only to oxygen as the most prevalent element in the earth's crust ($\approx 28\%$ by weight) and is found in widely diverse minerals. Free silica, for example, occurs in many crystalline forms, with quartz being by far the most prevalent form. Additionally, silicon chemically bonds with oxygen to form silicate minerals, and such minerals form the major constituents of the earth's outer layers. Silicates are also important constituents of meteorites and materials of lunar origin.

Among the commercially important silicate materials are the crystalline aluminosilicate zeolites, which occur in such natural forms as analcime, brewsterite, chabazite, clinoptilolite, dachiardite, erionite, faujasite, ferrierite, gismondine, gmelinite, heulandite, laumontile, levynite, mesolite, mordenite, natrolite, offretite, phillipsite, paulingite, scolecite, stilbite, and thomsonite. The commercial usefulness of zeolites encouraged the rapid development of synthetic zeolites, and a great number are now known, the following being among those disclosed in the patent literature: Zeolite A (U.S. Pat. No. 2,882,243), Zeolite B (U.S. Pat. No. 3,008,803), Zeolite D (Canadian Pat. No. 661,981), Zeolite E (U.S. Pat. No. 2,962,355), Zeolite F (U.S. Pat. No. 2,996,358), Zeolite H (U.S. Pat. No. 3,010,789), Zeolite J (U.S. Pat. No. 3,011,869), Zeolite L (U.S. Pat. No. 3,216,789), Zeolite M (U.S. Pat. No. 2,995,423), Zeolite O (U.S. Pat. No. 3,140,252), Zeolite Q (U.S. Pat. No. 2,991,151), Zeolite R (U.S. Pat. No. 3,030,181), Zeolite S (U.S. Pat. No. 3,054,657), Zeolite T (U.S. Pat. No. 2,950,952), Zeolite W (U.S. Pat. No. 3,012,853), Zeolite X (U.S. Pat. No. 2,882,244), Zeolite Y (U.S. Pat. No. 3,130,007), Zeolite Z (U.S. Pat. No. 2,972,516), Zeolite ZSM-4 (Canadian Pat. No. 817,915), and Zeolite Beta (U.S. Pat. No. 3,308,069). Other zeolites are also known, as for example, Zeolite Z-14US disclosed in U.S. Pat. No. 3,293,192, the zeolites disclosed in U.S. Pat. No. 3,227,660, and Zeolite ZSM-2 (U.S. Pat. No. 3,411,874), Zeolite Z-14 (U.S. Pat. No. 3,619,134), Zeolite K-G (U.S. Pat. No. 3,056,654), Zeolite ZK-4 (U.S. Pat. No. 3,314,752), Zeolite ZK-5 (U.S. Pat. No. 3,247,195), Zeolite ZK-21 (U.S. Pat. No. 3,355,246), Zeolite UJ (U.S. Pat. No. 3,298,780), and Zeolite W-Z (U.S. Pat. No. 3,649,178).

Both the natural and synthetic zeolites are comprised of a rigid three-dimensional framework of $SiO_4$ and $AlO_4$ tetrahedra joined by crosslinking oxygen atoms, and the resulting crystal lattice has an electronegative charge balanced by the inclusion of cations, sodium being almost exclusively found as the cation. The cations have considerable freedom of movement within the crystal framework and may be removed by ion exchange.

Because of their great affinity for adsorbing water, one of the first uses of zeolites was for drying or desiccation purposes. But other uses soon developed. In particular, due to their unique crystal structure, wherein each form of zeolite contains pore openings or cavities of microscopic size, many zeolites have been used as molecular sieves, that is, as agents for separating one molecule from another based upon the size of a molecule or portion thereof. Additionally, certain zeolites have been found to have catalytic properties with respect to hydrocarbon conversion reactions, as for example, in the cracking of hydrocarbons. These catalytic properties depend at least in part upon the zeolite having pore openings of sufficient size to allow ingress of relatively large hydrocarbon molecules into the interior of the crystal structure. Also critical is the presence of acid sites within the zeolite, which acid sites are usually produced by replacing some or all of the metal cations within the zeolite with hydrogen ions, using procedures well known in the art.

One zeolite of enormous importance in the catalysis of hydrocarbon conversion reactions is Zeolite Y, a zeolite having pores of diameter between about 6 and 15 angstroms, large enough to permit entry of even relatively large aromatic molecules into the zeolite. Zeolite Y, as disclosed in U.S. Pat. No. 3,130,007, has an X-ray powder diffraction pattern as shown in the following Table I, which reports all lines of at least weak intensity:

TABLE I

| Interplanar spacing d(A) | Relative Intensity |
| --- | --- |
| 14.37–14.15 | VS |
| 8.80–8.67 | M |
| 7.50–7.39 | M |
| 5.71–5.62 | S |
| 4.79–4.72 | M |
| 4.46–4.33 | M |
| 4.29–4.16 | W |
| 4.13–4.09 | W |
| 3.93–3.88 | W |
| 3.79–3.74 | S |
| 3.66–3.62 | M |
| 3.33–3.28 | S |
| 3.04–3.00 | M |
| 2.93–2.89 | M |
| 2.87–2.83 | S |
| 2.78–2.74 | M |
| 2.73–2.69 | W |
| 2.65–2.61 | M |
| 2.39–2.36 | M |
| 2.20–2.17 | W |
| 2.11–2.08 | W |
| 1.76–1.73 | W |
| 1.71–1.69 | W |

Zeolites of the Y type are of especial usefulness in the cracking or hydrocracking of hydrocarbons, particularly when ion-exchanged to contain hydrogen ions and when stabilized by either a partial ion exchange with rare earth cations as disclosed in U.S. Pat. Nos. 3,140,253 and 3,210,267 or by a steam calcination treatment as disclosed in U.S. Pat. No. 4,036,739.

Recently, another crystalline aluminosilicate zeolite, designated ZSM-5, has been established as useful in hydrocarbon conversion catalysis. ZSM-5 is particularly useful in the art of catalytic dewaxing because its uniform pore openings of between about 5 and 6 angstroms are especially suited to admitting waxy paraffinic hydrocarbons while rejecting larger-sized molecules. ZSM-5 zeolite is more particularly described in U.S. Pat. No. 3,702,886 wherein the following X-ray powder diffraction pattern is set forth:

TABLE II

| Interplanar spacing d(A): | Relative intensity |
|---|---|
| 11.1 ± 0.2 | S |
| 10.0 ± 0.2 | S |
| 7.4 ± 0.15 | W |
| 7.1 ± 0.15 | W |
| 6.3 ± 0.1 | W |
| 6.04 / 5.97 ± 0.1 | W |
| 5.56 ± 0.1 | W |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.04 ± 0.05 | W |
| 2.99 ± 0.02 | W |
| 2.94 ± 0.02 | W |

The commercial interest in ZSM-5 zeolite led to the development of a large number of zeolites similar to ZSM-5, which zeolites are exemplified by ZSM-8 (U.S. Pat. No. 3,700,585), ZSM-11 (U.S. Pat. No. 3,709,979), ZSM-12 (U.S. Pat. No. 3,832,449), ZSM-20 (U.S. Pat. No. 3,972,983), ZSM-23 (U.S. Pat. No. 4,076,842), ZSM-25 (U.S. Pat. No. 4,247,416), ZSM-35 (U.S. Pat. No. 4,016,245), ZSM-39 (U.S. Pat. No. 4,259,306). Also known are certain ferrierite-type zeolites known as ZSM-21 and ZSM-38 (U.S. Pat. No. 4,046,859) as well as other zeolites such as ZSM-18 (U.S. Pat. No. 3,950,496) and ZSM-43 (U.S. Pat. No. 4,209,497).

In addition to the crystalline aluminosilicate zeolites, certain siliceous crystalline materials consisting essentially of silica polymorphs are also useful as molecular sieves. One such silica polymorph is termed "silicalite" and is described more thoroughly in U.S. Pat. No. 4,061,724. Although similar to ZSM-5 in many respects, silicalite differs in that it is essentially free of aluminum and, unlike the zeolites, is hydrophobic and exhibits essentially no ion exchange properties. Silicalite is further characterized by a crystal structure comprising a channel system (or pore structure) of straight channels having an elliptical cross-section, which straight channels are intersected perpendicularly by zigzag channels of nearly circular cross-section. (See "Silicalite, a New Hydrophobic Crystalline Silica Molecular Sieve" by Flanigen et al., published in *Nature*, Volume 271, pp. 512 to 516, Feb. 9, 1978.) As reported in U.S. Pat. No. 4,061,724, the X-ray powder diffraction pattern of silicalite shows the following lines having a relative intensity of at least 10 percent of the intensity of the strongest line:

TABLE III

| Interplanar Spacing d(Angstroms) | Relative Intensity $I/I_o$ |
|---|---|
| 11.1 | 100 |
| 10.02 | 64 |
| 9.73 | 16 |
| 5.98 | 14 |
| 3.85 | 59 |
| 3.82 | 32 |
| 3.74 | 24 |
| 3.71 | 27 |
| 3.64 | 12 |

TABLE III-continued

| Interplanar Spacing d(Angstroms) | Relative Intensity $I/I_o$ |
|---|---|
| 3.34 | 11 |
| 2.98 | 10 |

Besides zeolites and silica polymorphs, other siliceous crystalline materials are known in the art, and these include the synthetic organosilicates disclosed in U.S. Pat. No. 4,104,294, the silicates disclosed in U.S. Pat. No. 4,208,305, and the metal organosilicates disclosed in U.S. Pat. No. Re. 29,948. In view of these patents, and the numerous patents relating to zeolites, and the published literature relating to silicalite (and similar materials such as "Silicalite-2," a composition disclosed in an article entitled "Silicalite-2, a Silica Analogue of the Aluminosilicate Zeolite ZSM-11," published in *Nature* by Bibby et al., Volume 280, pages 664 and 665, Aug. 23, 1979), it is evident that there is an ongoing effort in the art to develop new and useful siliceous crystalline materials, especially those having a uniform pore structure.

The main object of the invention is to provide a metal-containing siliceous crystalline material useful in catalysis, as for example in the hydrodewaxing of paraffinic hydrocarbons. Another object is to provide a method for synthesizing metal-containing siliceous crystalline materials, and especially rare earth, siliceous crystalline materials. Yet another object is to provide a catalytic process wherein the crystalline composition of the invention is utilized as a catalyst or component thereof. These and other objects and advantages will reveal themselves to those skilled in the art in light of the following description of the invention.

SUMMARY OF THE INVENTION

In accordance with the present invention, a siliceous metal-containing crystalline composition is prepared by admixing a basic solution of a silica salt and a metal component, followed by addition of a quaternary ammonium compound having a formula of $R_4N^+X^-$ wherein R is an organic substituent containing from one to fifty carbon atoms and X is either a hydroxide or a halide. After hydrothermal aging under pressure, the reaction mixture containing the quaternary ammonium compound yields a metal-containing, siliceous crystalline composition useful as a catalyst for oxidation, alkylation, disproportionation, synthesis gas conversion, hydrocracking, and most especially, hydrodewaxing.

The crystalline composition of the invention is characterized by an X-ray powder diffraction pattern having its strongest absorption line at an interplanar spacing less than 5 Å, and most usually at about 3.85±0.4 Å. In addition, the X-ray powder diffraction pattern exhibits a significant absorption line of at least weak intensity at one or more of the following interplanar spacings: 11.0±0.2 Å, 9.96±0.2 Å, 3.75±0.2 Å, 3.71±0.2 Å, 3.64±0.2 Å, 3.44±0.2 Å, 3.30±0.2 Å, 3.14±0.2 Å, 3.05±0.2 Å, or 2.97±0.2 Å, and usually the diffraction pattern indicates only one significant line between the interplanar spacings of 3.8 and 3.9 Å.

The X-ray powder diffraction pattern is most usually characterized by lines having an intensity relative to the strongest line as shown in the following Table IV:

TABLE IV

| Interplanar Spacing d(Angstroms) | Relative Intensity $I/I_o$ |
| --- | --- |
| 11.0 ± 0.2 | W to M |
| 9.96 ± 0.2 | W to M |
| 3.85 ± 0.4 | S to VS |
| 3.75 ± 0.2 | W to M |
| 3.71 ± 0.2 | M |
| 3.64 ± 0.2 | M |
| 3.44 ± 0.2 | M to VS |
| 3.30 ± 0.2 | W to S |
| 3.14 ± 0.2 | W to S |
| 3.05 ± 0.2 | W |
| 2.97 ± 0.2 | W | with it being understood, in the foregoing table and others presented hereinafter with respect to X-ray powder diffraction patterns, that W refers to a line of weak intensity from 10% up to 25% of that of the strongest line in the X-ray diffraction pattern, M refers to a line of medium intensity from 25% up to 60% of the strongest line, S refers to a line of strong intensity from 60% up to 80% of the strongest line, and VS refers to a line of very strong intensity from 80% up to and including 100% of that of the strongest line. Thus, if as is customary in the interpretation of X-ray diffraction data, an arbitrary value of 100 is assigned to the strongest line, then the weak lines herein will have values from 10 up to 25, the medium from 25 up to and 60, the strong from 60 up to 80, and the very strong from 80 up to and including 100. Also, as reported in the foregoing table, certain lines are reported in ranges, as for example, from W to M in the case of the interplar spacing at 11.0 Å, so that the values for this interplanar spacing span the weak and medium ranges, i.e., from a minimum value of 10 up to but not including 60.

DETAILED DESCRIPTION OF THE INVENTION

The crystalline compositions of the present invention may be prepared by reacting a quaternary ammonium ion and a gel formed by combining a metal component under alkaline conditions with a source of silicon, such as an aqueous liquid containing a silicon component in dissolved or colloidal form. The silicon source is usually contained in an alkaline, aqueous medium and may, for example, be an alkaline solution of a silicate salt, with salts of ammonia and the alkali metals generally proving to be the more suitable. A preferred solution is a sodium silicate solution containing between about 25 and 40 weight percent $SiO_2$ and, optionally, may further contain a surfactant such as Dowfax 2A1 marketed by the Dow Chemical Company. Alternatively and more preferably, a reactive silica sol may be utilized, such as a commercial Ludox containing 30 percent by weight $SiO_2$ in an alkaline medium. Other sources of silica include colloidal silicas in aqueous basic media, as well as silica gels and fume silicas in reactive forms.

To the alkaline solution containing a source of silica is added a component containing the metal or metals desired in the final crystalline product. This may be accomplished, for example, by the direct addition of a solid metal salt if it is soluble in the aqueous, alkaline medium containing the silica component. Many metals, however, and especially the rare earth metals, are not soluble in alkaline media, and as a result, it is generally necessary to prepare an aqueous acidic solution containing the metal desired in the final product. Such solutions usually contain a dissolved chloride, nitrate, acetate, carbonate, or oxalate of the desired metal and further contain the desired metal in any concentration up to the solubility limit, with concentrations of 0.5% to 10% by weight being preferred.

The metals which may be utilized to produce the metal-containing siliceous compositions of the invention include all metals, semi-metals, and metalloids, and it will be understood that reference to a "metal" or "metals" herein is meant to include the semi-metals and metalloids, as well as those elements which are truly metallic. In general, the more suitable metals are selected from the group consisting of titanium, chromium, vanadium, iron, cobalt, nickel, copper, antimony, manganese, niobium, molybdenum, germanium, ruthenium, arsenic, tellurium, tantalum, tungsten, rhenium, osmium, and iridium. Preferred metals include yttrium, zirconium, scandium, zinc, rhodium, palladium, silver, cadmium, indium, tin, hafnium, platinum, gold, mercury, thallium, lead, bismuth, actinium, thorium, and uranium, with the most preferred metals being the members of the lanthanide series: lanthanum, cerium, praseodymium, neodymium, promethium, samarium, europium, gadolinium, terbium, dysprosium, holmium, erbium, thulium, ytterbium, and lutetium.

Metals which are generally unsuitable in the invention include the alkali metals and the alkaline earth metals, since their use tends to result in the production of a crystalline product containing a metal removable by dissolution in water. Also unsuitable are aluminum, boron, and gallium, which, although resulting in a stable composition, usually result in either a zeolite (if aluminum is utilized) or a zeolite-like product (if boron or gallium is chosen). The compositions of the invention herein will differ from the zeolites in having little or no ion exchange properties and will usually be hydrophobic as well, adsorbing less than about 10%, preferably less than about 5%, of their weight in water at 25° C. in the presence of water vapor at a partial pressure of about 0.2 to 1.0 p.s.i.a. Accordingly, it is most highly preferred in the invention that the reactants utilized in preparing the compositions herein be essentially free of aluminum, boron, and gallium, containing such metals in trace proportions no greater than about 0.1% by weight, so that the final crystalline composition is essentially free of aluminum, boron, and gallium, containing said metals in a total proportion no greater than about 0.75% by weight (calculated as the oxides thereof), with proportions less than 0.5% by weight being most preferred.

In accordance with the invention, one or more of the foregoing metals or compounds thereof are added to the solution containing the silicon source, and under alkaline conditions, and preferably under highly alkaline conditions wherein a pH above about 10 is maintained, a gelatinous substance is produced. The alkaline conditions necessary for reaction are usually maintained by utilizing a silica source of sufficiently high pH to ensure that, even with the addition of a metal dissolved in an acid medium, the pH of the reaction mixture will still not fall below 7.0, and will preferably remain above 10.0. If necessary, however, pH adjusters, such as ammonium hydroxide or pyridine, may be added to maintain the pH at the desired level.

Since the gel formed by the reaction of the metal component and the silicon source is a precursor of the final crystalline product composition, and since it is usually desirable, although not critical, that the product composition contain the metal or metals in a uniform distribution, it is highly preferable that the reaction between the silicon and metal components be performed under controlled conditions producing a gel containing the metal or metals in a fairly homogeneous distribution. This may be accomplished by simultaneously adding the alkaline solution containing the silicon component and a solution of the desired metal to a reaction vessel at constant rates, thereby ensuring a relatively constant reaction rate of metal with silicon component, producing a homogeneous product having a metal content dependent upon the rate of metal addition to that of silicon.

After the metal and silicon-containing gel has been produced in accordance with the above procedure or its equivalent, the gel is reacted with a quaternary ammonium ion, provided from a source such as an aqueous solution of a quaternary ammonium component selected from the group consisting of the n-propylammonium and n-butylammonium bromides and chlorides. The preferred compound is tetrapropylammonium bromide, but any of a number of compounds of formula $R_4N^+X^-$ wherein X is either a hydroxide or a halide and R is an organic moiety containing from 1 to 50 carbon atoms may be utilized. Of these, the more suitable will have an R moiety consisting of an alkyl group containing from 1 to 6 carbon atoms.

The quaternary ammonium compound selected for reaction may be added directly to the mixture in which the gel was produced or, less preferably, generated in situ by addition of appropriate chemical reactants, as for example, tripropyl amine plus n-propyl bromide dissolved in an organic solvent such as methyl ethyl ketone. Usually, however, in situ generation will be found less convenient than direct addition of a quaternary ammonium compound. Further, since the reaction of tripropyl amine and n-propyl bromide, or other quaternary ammonium ion precursors, cannot be expected to proceed to completion, greater costs will be incurred with in situ generation then with direct addition, since larger quantities of chemicals will usually be required to ensure an adequate amount of available quaternary ammonium ions.

To produce the crystalline product of the invention, the admixture of quaternary ammonium compound and the gel, which admixture will generally be in the form of an amorphous slurry, is subjected to pressurized hydrothermal aging conditions. This may be accomplished by subjecting the slurry to temperatures in the range of 25° to 300° C. and pressures ranging from 15 to 2,000 p.s.i.g., with temperatures of 120° to 200° C. and pressures of 25 to 2000 p.s.i.g. being preferred. A crystalline material will then form, usually after a time period of between about 1 and 500 hours; the exact time period will vary considerably, as more severe conditions of temperature and pressure will tend to yield the crystalline material more rapidly than will relatively mild conditions.

The crystalline material is then separated from the mother liquor, and after washing in water to remove water-soluble components, an organo-metallic, silicon-containing crystalling product is recovered. If, as most usually is the case, a crystalline product free of organic components is desired, then the organo-crystalline substance is subjected to a high temperature calcination, generally in the presence of air, so as to remove virtually all the organo-component and leave a product composition of the invention.

Although the invention is not limited to any theory of operation, it is believed that siliceous, metal-containing crystalline compositions prepared by the foregoing method or its equivalent have a crystal framework, depending upon the metal or metals introduced into the composition, composed of either silicon or oxygen atoms or silicon, oxygen and metal atoms. In the former instance, the composition is believed most properly termed a metal-containing crystalline silica, with one or more metal oxides being contained in the voids or interstices formed by the silicon-oxygen framework. Such a structure is especially believed to result when the metal introduced into the crystalline composition is in an oxidation state wherein the ionic radius thereof is above about 0.75 Å. On the other hand, for metals introduced in a cationic form of ionic radius smaller than 0.75 Å, it is believed that, at least to some extent, the metals form part of the crystal framework, with the resultant composition being a metal silicate, or perhaps a metal silicate in combination with a crystalline silica or metal-containing crystalline silica. The preferred compositions are those comprising a metal-containing crystalline silica, especially those containing a metal in an oxidation state wherein the ionic radius is above about 0.9 Å.

The crystalline compositions of the invention usually contain between about 1 and 25 percent by weight of the desired metal or metals, calculated as the most common oxide or oxides thereof. Preferred compositions contain between 3 and 20 percent by weight of the metals, and the atom ratio of metal to silicon for the preferred compositions fall in the range of 0.03 to 0.15. A somewhat broader range pertains to suitable compositions, i.e., from 0.01 to 0.20.

The X-ray powder diffraction patterns of the crystalline compositions wherein vary according to the amount and kind of metal or metals introduced into the composition, as well as by the degree of homogeniety achieved in the preparation of the gel precursor described hereinbefore. Typical compositions are characterized by an X-ray powder diffraction pattern having its strongest line at an interplanar spacing less than 5 Å, usually at between 3 and 4 Å, and most usually and preferably at 3.85±0.4 Å, with significant lines of at least weak intensity appearing at one or more of the following interplanar spacings: 11.0±0.2 Å, 9.96∓0.2 Å, 3.75±0.2 Å, 3.71±0.2 Å, 3.64±0.2 Å, 3.44±0.2 Å, 3.30±0.2 Å, 3.14+0.2 Å, 3.05±0.2 Å, or 2.97±0.2 Å.

The preferred crystalline compositions are characterized by the following X-ray powder diffraction pattern:

TABLE V

| Interplanar Spacing d(Angstroms) | Relative Intensity $I/I_o$ |
| --- | --- |
| 11.0 ± 0.2 | M |
| 9.96 ± 0.2 | M |
| 3.85 ± 0.4 | VS |
| 3.75 ± 0.2 | M |
| 3.71 ± 0.2 | M |
| 3.64 ± 0.2 | M |
| 3.44 ± 0.2 | M to VS |
| 3.30 ± 0.2 | W to S |
| 3.14 ± 0.2 | W to S |
| 3.05 ± 0.2 | W |
| 2.97 ± 0.2 | W |

A comparison of the above X-ray diffraction pattern with other siliceous crystalline compositions reveals significant differences. For example, in comparison to silicalite, the above diffraction pattern indicates only one significant line between the 3.8 and 3.9 Å interplanar spacings whereas silicalite is characterized by a doublet between these spacings, with one significant line usually being at 3.82 Å and the other at 3.85 Å. Another difference between the present compositions and silicate is found in the fact that silicalite has its strongest line at about 11.1 Å whereas the crystalline compositions of the invention all have their strongest lines below an interplanar spacing of 5Å, with the strongest line usually being at 3.85 Å±0.4, and occasionally at 3.44±0.2.

Substantial differences may also be found between the crystalline composition of the invention and other crystalline materials of the prior art, such as the zeolites. In comparison to the zeolites, the present compositions are not only essentially aluminum-free, but the metals contained in the crystalline compositions of the invention are substantially non-ionexchangeable, as for example in aqueous liquid media. Also, numerous differences based upon X-ray diffraction patterns between the siliceous crystalline materials of the invention and the zeolites may be found. In one illustration, the present composition are found to be significantly different from metal-exchanged ZSM-5 compositions, and this is evidenced by the fact that the significant lines at interplanar spacings of 3.14±0.2 Å, 3.30±0.2 Å, 3.44±0.2 Å, and 3.64±0.2 Å are found in the X-ray diffraction pattern of many embodiments of the composition of the invention, but ZSM-5 is not reported to have an X-ray diffraction pattern showing significant lines at these locations. Moreover, ZSM-5 zeolites have significant lines not found to pertain to the composition of the invention, with the strong line at 10.0±0.2 Å for ZSM-5 being illustrative.

The following Examples provide methods for producing various embodiments of the composition of the present invention, and X-ray diffraction data with respect to several of these embodiments are also provided. The Examples, however, are not to be construed as limiting the scope of the invention, which is defined by the claims.

EXAMPLE 1

A metal-containing siliceous crystalline composition is synthesized from $Na_2SiO_3$, Dowfax 2A1, acetic acid, sodium chloride, lanthanum nitrate and water. A silica-containing reaction solution is prepared by dissolving 3380 g $Na_2SiO_3$ and 10 g Dowfax 2A1 in 1960 ml water. One liter of the silica-containing solution is added to a buret.

A second reaction solution containing lanthanum in the form of a dissolved metal salt is prepared by adding 125 ml acetic acid, 38 g sodium chloride, and 44 g lanthanum nitrate to 510 ml $H_2O$. One-half liter of the metallic salt-containing solution is added to a second buret. Each buret is equipped with a liquid flow rotamer for controlling the rate at which the solution is added.

A cogel is formed by adding simultaneously the basic silica solution and the metallic solution is a three-neck flask. By use of the controlled flow burets the silica-containing solution is added at twice the rate of the metallic-containing solution. The reaction mixture is rapidly stirred throughout the addition, by use of an overhead stirrer.

After the liquid contents of the burets are added to the reaction flask, a mixture of 54 g tri-propylamine, 49 g n-propyl bromide and 94 g methylethylketone is added. This reaction mixture is stirred and refluxed for 16 hours.

The resulting slurry is placed in a two-liter autoclave purged with a nitrogen atmosphere and then subjected to a pressure of 100 p.s.i.g. and heated to 320° F. for 24 hours. While in the autoclave, the reaction mixture is continuously stirred. The resulting crystalline material is washed with one liter of water and calcined at 250° C. An X-ray powder diffraction pattern of the resulting lanthanum-containing crystalline composition is presented in the following Table VI:

TABLE VI

| Interplanar Spacing d(Angstrom) | Relative Intensity $I/I_o$ |
|---|---|
| 11.0 | 44 |
| 9.96 | 28 |
| 9.83 | 14 |
| 7.41 | 9 |
| 7.05 | 6 |
| 6.68 | 6 |
| 6.50 | 11 |
| 6.08 | 7 |
| 5.97 | 8 |
| 5.71 | 8 |
| 5.56 | 11 |
| 5.13 | 7 |
| 4.98 | 6 |
| 4.60 | 10 |
| 4.35 | 11 |
| 4.25 | 13 |
| 4.08 | 4 |
| 3.99 | 10 |
| 3.85 | 100 |
| 3.75 | 32 |
| 3.71 | 44 |
| 3.64 | 44 |
| 3.56 | 6 |
| 3.44 | 29 |
| 3.30 | 20 |
| 3.14 | 15 |
| 3.05 | 11 |
| 2.97 | 12 |
| 2.94 | 6 |

EXAMPLE 2

The procedure of Example 1 is repeated except that 33 g of cerium nitrate is added in place of 44 g of lanthanum nitrate. An X-ray powder diffraction pattern of the resulting cerium-containing crystalline composition is presented in the following Table VII:

TABLE VII

| Interplanar Spacing d(Angstrom) | Relative Intensity $I/I_o$ |
|---|---|
| 11.0 | 45 |
| 9.96 | 26 |
| 9.83 | 19 |
| 7.41 | 9 |
| 6.68 | 5 |
| 6.50 | 7 |
| 6.08 | 9 |
| 5.71 | 7 |
| 5.56 | 12 |
| 5.13 | 9 |
| 4.98 | 6 |
| 4.60 | 7 |
| 4.35 | 9 |
| 4.25 | 14 |
| 4.08 | 9 |
| 3.99 | 9 |
| 3.85 | 100 |
| 3.75 | 26 |

TABLE VII-continued

| Interplanar Spacing d(Angstrom) | Relative Intensity $I/I_o$ |
| --- | --- |
| 3.71 | 50 |
| 3.64 | 43 |
| 3.44 | 67 |
| 3.30 | 48 |
| 3.14 | 50 |
| 3.05 | 12 |
| 2.97 | 16 |
| 2.94 | 5 |

EXAMPLE 3

The procedure of Example 1 is repeated except that 37 g of $Pr(C_2H_3O_2)_3$ is added in place of 44 g of lanthanum nitrate. The X-ray powder diffraction pattern of the resulting crystalline product is presented in the following Table VIII:

TABLE VIII

| Interplanar Spacing d(Angstrom) | Relative Intensity $I/I_o$ |
| --- | --- |
| 11.0 | 38 |
| 9.96 | 29 |
| 6.50 | 12 |
| 6.08 | 6 |
| 5.97 | 12 |
| 5.13 | 15 |
| 4.98 | 6 |
| 4.60 | 9 |
| 4.35 | 9 |
| 4.25 | 9 |
| 3.85 | 100 |
| 3.75 | 32 |
| 3.71 | 34 |
| 3.64 | 38 |
| 3.44 | 85 |
| 3.30 | 65 |
| 3.14 | 66 |
| 3.05 | 12 |
| 2.97 | 15 |

EXAMPLE 4

The procedure of Example 1 is repeated except that 48 g of $Sn(C_2H_3O_2)_2$ is added in place of 44 g of lanthanum nitrate. An X-ray powder diffraction pattern of the resulting tin-containing crystalline composition is as shown in the following Table IX:

TABLE IX

| Interplanar Spacing d(Angstrom) | Relative Intensity $I/I_o$ |
| --- | --- |
| 11.0 | 51 |
| 9.96 | 31 |
| 9.83 | 14 |
| 7.41 | 10 |
| 6.50 | 13 |
| 6.08 | 10 |
| 5.56 | 10 |
| 5.13 | 10 |
| 4.60 | 13 |
| 4.35 | 10 |
| 4.25 | 13 |
| 3.85 | 100 |
| 3.75 | 39 |
| 3.71 | 49 |
| 3.64 | 42 |
| 3.44 | 79 |
| 3.30 | 52 |
| 3.14 | 58 |
| 3.05 | 13 |

TABLE IX-continued

| Interplanar Spacing d(Angstrom) | Relative Intensity $I/I_o$ |
| --- | --- |
| 2.97 | 13 |

EXAMPLE 5

The procedure of Example 1 is repeated except that 106 g of tetrapropylammonium bromide is added in place of 54 g tri-propylamine and 49 g n-propyl bromide.

EXAMPLE 6

The procedure of Example 1 is repeated except that 22 g $La(NO_3)_3.6H_2O$ and 24 g $Sn(C_2H_3O_2)_2$ are added in place of 44 g of lanthanum nitrate. An X-ray powder diffraction pattern of the resulting crystalline product is as shown in the following Table X:

TABLE X

| Interplanar Spacing d(Angstrom) | Relative Intensity $I/I_o$ |
| --- | --- |
| 11.0 | 21 |
| 9.96 | 15 |
| 6.50 | 9 |
| 5.56 | 8 |
| 5.13 | 18 |
| 4.60 | 8 |
| 4.35 | 8 |
| 4.25 | 10 |
| 3.99 | 8 |
| 3.85 | 64 |
| 3.75 | 18 |
| 3.71 | 37 |
| 3.64 | 36 |
| 3.56 | 24 |
| 3.44 | 100 |
| 3.30 | 58 |
| 3.14 | 77 |
| 3.05 | 10 |
| 2.97 | 10 |

The siliceous, metal-containing crystalline material of the invention finds usefulness as a molecular sieve, but is most especially useful as a catalyst or a catalsty component. In general, one selects a metal for the crystalline composition of the invention which catalytically promotes the desired chemical reaction. For example, in the oxidation of $H_2S$ to elemental sulfur (using $O_2$ or $SO_2$ as oxidant) or sulfur dioxide (using $O_2$ oxidant) at temperatures between about 250° and 900° F., and pressures between about 5 and 500 p.s.i.a., and at space velocities between about 500 and 5,000 v/v/hr., a most suitable choice for catalytically active metal is vanadium. On the other hand, a Group VIII metal such as nickel would be a preferred choice with respect to alkylation, transalkylation, or disproportionation reactions. As an illustration, in the alkylation of benzene with propylene to isopropylbenzene, a nickel-containing siliceous crystalline composition of the invention may be utilized at 300° to 400° F., 250 to 700 p.s.i.g., and 1 to 10 WHSV, with the following specific conditions being most useful: 325° F., 500 p.s.i.a., and 7.5 weight hourly space velocity. Another catalytic use for the crystalline compositions herein is in synthesis gas conversion wherein hydrogen is mixed with carbon monoxide, as for example in molar ratios between 2:1 and 3:1, $H_2:CO$, with the resultant mixture then being converted to a distribution of Fischer-Tropsch products such as methane, ethane, ethylene, and aromatic compounds by passage over a catalyst containing a siliceous crystalline composition of the invention further containing iron, nickel, or cobalt. For this purpose, temperatures between 480° and 750° F., pressures between 250 and 2,000 p.s.i.g., and space velocities between 1,500 and 10,000 GHSV are suitable, with the following conditions being considered most useful: 662° F., 1,000 p.s.i.g., and 4,000 GHSV. Similar conditions are useful for converting water and carbon monoxide to methanol with nickel, cobalt, or iron-containing crystalline compositions of the invention.

One especially preferred catalytic use for the compositions of the invention is in catalytic hydrodewaxing. Oftentimes in hydrodewaxing, the object is to lower the pour point, freeze point, or viscosity of a liquid hydrocarbon by contact with a hydrodewaxing catalyst in the presence of hydrogen under appropriate conditions of elevated temperature and pressure, wherein the waxy paraffins of the liquid hydrocarbon are converted, by a hydrocracking mechanism, and in many cases a highly selective mechanism for hydrocracking the paraffins over other components, to product hydrocarbons of lower average molecular weight and boiling point. In the present invention, this process is modified by utilizing a hydrodewaxing catalyst containing a crystalline composition of the invention, with crystalline compositions containing a Group VIB metal or a Group VII metal being preferred, and with a Group VIB metal and VII metal in combination being highly preferred, and with nickel and tungsten in combination being most highly preferred. Conditions for operation may be those conventionally utilized in hydrodewaxing, as for example, temperatures above 650° F., pressures above 750 p.s.i.g., a space velocity between 0.1 and 10 LHSV, and a hydrogen recycle rate greater than 500 standard cubic feet per barrel of feed. Preferred conditions are as follows: 720° to 750° F. operating temperature, 2,000 to 2,500 p.s.i.g. operating pressure, a space velocity of 0.5 to 2.0 LHSV, and a hydrogen recycle rate of 6,000 to 10,000 scf/bbl.

When used as a catalytic agent in one or more of the foregoing processes, the siliceous, metal-containing crystalline compositions of the invention are usually dispersed in a porous refractory oxide, such as alumina, silica, silica-alumina, etc. This may be accomplished, for example, by first admixing the crystalline composition with an alumina, silica, or silica-alumina gel, then shaping the admixed material into a desired size and shape, e.g., by extrusion through a die having small-diameter (e.g., 1/16 to ¼ inch) circular holes followed by cutting into particles of suitable length (e.g., 1/16 to ½ inch), and finally calcining the shaped material in the presence of air at an elevated temperature, as for example, 900° to 1600° F. If desired, one or more active catalytic metals (in addition to those present in the cyrstalline composition) may be introduced into the catalyst by any of a variety of methods. In one embodiment, the shaped material prior to calcination is impregnated with a liquid containing the active metal in dissolved form. In another, the refractory oxide gel is admixed with a solid salt or hydroxide of the desired active metal, the resulting admixture then being shaped and calcined as described above.

Additionally, the foregoing catalysts are believed to be substantially improved by the presence of a rare earth metal component in the crystalline composition of the invention. The rare earth metal either promotes or aids in promoting the desired chemical reactions and is further believed to increase the stability of the cyrstalline material at elevated temperatures (e.g., above 900° F.), particularly in the presence of water vapor, as for example at temperatures of 1100° to 1600° F. in the presence of water vapor at a partial pressure above about 5 p.s.i.a. Thus, it is a preferred embodiment of the invention that catalysts prepared with the crystalline composition of the invention contain a rare earth metal component, either alone if active for promoting the intended chemical conversion or, if not, in conjunction with another component having the required catalytic activity.

Catalytic crystalline compositions of the invention containing a lanthanide element therein are highly useful for catalytically promoting the conversion of $C_4$ to $C_{10}$ hydrocarbons to maleic anhydride oxidation. In this process, a cerium-containing crystalline composition is preferred, and such a composition may be incorporated into a suitable catalyst by comulling with a solution or slurry containing vanadium, tin, and phosphorus components followed first by shaping into a desired size and shape and then calcining. A most preferred comulling procedure involves admixing a slurry comprising ammonium metavanadate, phosphoric acid, stannous chloride, water, ethanol, and hydrochloric acid with a cerium-containing crystalline composition and a porous refractory oxide precursor, such as an alumina or silica-alumina gel. After shaping and calcining operations, an active catalyst is produced for promoting the oxidation of hydrocarbons such as butane, butene and butadiene with air (or other source of oxyen) to maleic anhydride under conditions selected from the following: 500° to 1200° F., 500 to 3,000 GHSV, and 5 to 50 p.s.i.a.

Although the invention has been described by reference to several embodiments, including a preferred embodiment thereof, together with examples relating to preparation methods suitable for producing the compositions of the invention, it is not intended that the invention be limited to the disclosed embodiments or examples. Obviously, many variations, modifications, combinations and alternatives of the invention as described will be apparent to those skilled in the art. Accordingly, the invention is intended to embrace all such variations, modifications, alternatives and combinations which fall within the spirit and scope of the appended claims.

I claim:

1. A crystalline composition comprising silicon, oxygen and a rare earth metal selected from the group consisting of lanthanum, cerium, praseodymium, neodymium, promethium, samarium, europium, gadolinium, terbium, dysprosium, holmium, erbium, thulium, ytterbium, lutetium and mixtures thereof, wherein said crystalline composition contains less than about 0.75 weight percent of aluminum, boron and gallium and is characterized by an X-ray powder diffraction pattern having a line of at least strong intensity at an interplanar spacing less than about 5 Angstroms and liens of at least medium intensity at interplanar spacings of 3.64 Angstroms, 3.44 Angstroms, 3.30 Angstroms and 3.14 Angstroms.

2. A crystalline composition as defined by claim 1 wherein said rare earth metal comprises cerium.

3. A crystalline composition as defined by claim 1 wherein said line of at least strong intensity occurs at an interplanar spacing between about 3.8 and about 3.9 Angstroms and wherein said X-ray powder diffraction pattern does not contain any other significant line at an interplanar spacing between 3.8 and 3.9 Angstroms.

4. A crystalline composition as defined by claim 1 wherein said crystalline composition is essentially free of aluminum, boron and gallium.

5. A crystalline composition as defined by claim 3 wherein said X-ray powder diffraction pattern also contains a line of at least medium intensity at interplanar spacings of 3.71 Angstroms and 3.75 Angstroms.

6. A crystalline composition as defined by claim 5 wherein said X-ray powder diffraction pattern also contains a line of at least weak intensity at an interplanar spacing of 2.97 Angstroms.

7. A crystalline composition as defined by claim 3 wherein said X-ray powder diffraction pattern also contains lines of at least medium intensity at interplanar spacings of 11.0±0.2 Angstroms, 9.96±0.2 Angstroms, 3.75 Angstroms, and 3.71 Angstroms.

8. A crystalline composition as defined by claim 7 wherein said line at an interplanar spacing between 3.8 and 3.9 Angstroms occurs at an interplanar spacing of 3.85 Angstroms and is the strongest line in said X-ray powder diffraction pattern.

9. A crystalline composition as defined by claim 1 wherein said X-ray powder diffraction pattern also contains lines of medium intensity at interplanar spacings of 11.0±0.2 Angstroms, 9.96±0.2 Angstroms, 3.75 Angstroms and 3.71 Angstroms, and lines of weak intensity at interplanar spacings of 3.05 Angstroms and 2.97 Angstroms, wherein said line at an interplanar spacing between 3.8 and 3.9 Angstroms occurs at an interplanar spacing of 3.85 Angstroms and has a very strong intensity.

10. A crystalline composition which comprises silicon, oxygen and a rare earth metal selected from the group consisting of lanthanum, cerium, praseodymium, neodymium, promethium, samarium, europium, gadolinium, terbium, dysprosium, holmium, erbium, thulium, ytterbium, lutetium and mixtures thereof, wherein said crystalline composition is essentially free of aluminum, boron and gallium and is characterized by an X-ray powder diffraction pattern having a line of at least strong intensity at an interplanar spacing between about 3.8 and about 3.9 Angstroms and lines of at least medium intensity at interplanar spacings of 3.64±0.01 Angstroms, 3.44±0.01 Angstroms, 3.30±0.01 Angstroms and 3.14±0.01 Angstroms.

11. A crystalline composition as defined by claim 10 wherein said rare earth metal comprises praseodymium.

12. A crystalline composition as defined by claim 10 wherein said line at an interplanar spacing between 3.8 and 3.9 Angstroms is the strongest line in said X-ray powder diffraction pattern.

13. A crystalline composition as defined by claim 12 wherein said rare earth metal is contained substantially in a form not removable by cation exchange in an aqueous liquid medium.

14. A crystalline composition as defined by claim 10 wherein said rare earth metal is selected from the group consisting of lanthanum, cerium and praseodymium.

15. A crystalline composition as defined by claim 10 wherein said crystalline composition is characterized by an X-ray powder diffraction pattern comprising the interplanar spacings and relative intensities set forth below:

| Interplanar Spacing in Angstroms | Relative Intensity |
| --- | --- |
| 11.0 | 45 |
| 9.96 | 26 |
| 9.83 | 19 |
| 7.41 | 9 |
| 6.68 | 5 |
| 6.50 | 7 |
| 6.08 | 9 |
| 5.71 | 7 |
| 5.56 | 12 |
| 5.13 | 9 |
| 4.98 | 6 |
| 4.60 | 7 |
| 4.35 | 9 |
| 4.25 | 14 |
| 4.08 | 9 |
| 3.99 | 9 |
| 3.85 | 100 |
| 3.75 | 26 |
| 3.71 | 50 |
| 3.64 | 43 |
| 3.44 | 67 |
| 3.30 | 48 |
| 3.14 | 50 |
| 3.05 | 12 |
| 2.97 | 16 |
| 2.94 | 5. |

16. A crystalline composition as defined by claim 10 wherein said rare earth metal is cerium.

17. A crystalline composition as defined by claim 1 wherein the lines at interplanar spacings of 3.44 Angstroms, 3.30 Angstroms and 3.14 Angstroms are of at least strong intensity.

18. A crystalline composition as defined by claim 10 wherein the lines at interplanar spacings of 3.44 Angstroms, 3.30 Angstroms and 3.14 Angstroms are of at least strong intensity.

19. A crystalline composition as defined by claim 1 further comprising vanadium.

20. A crystalline composition as defined by claim 1 further comprising a Group VIII metal and a Group VIB metal.

21. A crystalline composition as defined by claim 1 further comprising iron, nickel or cobalt.

* * * * *